July 31, 1945.   W. C. BUTTNER   2,380,576
CUT-OFF VALVE
Filed Nov. 29, 1940

William C. Buttner
INVENTOR
BY
HIS ATTORNEY

Patented July 31, 1945

2,380,576

UNITED STATES PATENT OFFICE 2,380,576

CUTOFF VALVE

William C. Buttner, Winnetka, Ill., assignor to The Bastian-Blessing Co., Chicago, Ill., a corporation of Illinois Application November 29, 1940, Serial No. 367,762

11 Claims. (Cl. 137—153)

This invention relates to cut-off valves generally, and more particularly to an automatic cut-off valve which can be mounted in the supply line of a gas burning appliance to prevent the passage of gas through the supply line whenever certain unsafe conditions develop in the appliance or in the valve itself.

This application is a continuation in part of an application filed by William C. Buttner, September 12, 1938, for a Cut-off valve, Ser. No. 229,422.

During the operation of a modern gas burning appliance year after year, original instructions are very often lost and forgotten. Familiarity brings a certain amount of carelessness and with the streamlining of gas appliances, in which most of the operating parts and pipes are concealed, dangerous situations develop which are not apparent upon casual observation.

Furthermore, in many modern appliances as with gas furnaces, the gas supply is turned on and off automatically with no opportunity for the owner of the dwelling or place of business in which the appliance is installed, to make repeated investigations.

Then, in event the gas supply is stopped at its source or the gas pressure in the service line falls below a predetermined minimum for any reason whatsoever, a dangerous condition develops which might result in fires or explosions if the gas pressure is restored without some means being provided to prevent a renewed flow through those appliances until the appliances are shut off and relighted.

Various means have been provided to solve the situation including automatic safety cut-off valves, but in most of these instances, the valves themselves create a secondary hazardous condition even though they may, in some instances, have a certain degree of utility in controlling the flow of gas to an appliance, under certain conditions.

It is one of the objects of the present invention to provide an improved cut-off valve of the type described.

A further object of the invention is to provide a valve which not only protects against unsafe conditions developing in an appliance, but also serves to protect against dangerous conditions developing in the valve itself.

Another object of the invention is to provide an automatic cut-off valve which has a slightly delayed closing action when the output side thereof is subjected to a greatly reduced pressure as where a sudden withdrawal of gas is required to start an appliance, a withdrawal which would operate to close conventional valves. As a corollary to this object, it is possible with the delayed closing to adjust the valve more closely to the maximum withdrawal of any given appliance to which the valve is connected, thus broadening the safety action of the valve to include hazardous conditions which might otherwise not be detected by conventional valves.

A further object of the invention is to provide an improved means for automatically stopping the flow of gas into the valve itself whenever an unsatisfactory condition of pressure exists in or beyond the valve compartment.

Another object of the invention is to provide an automatic cut-off which requires individual manual attention to reopen it after the gas supply has been once cut off for any condition whatsoever, and by this requirement, serves as a warning that something is or was wrong when the cut-off happened.

A further improvement resides in the ease with which the valve can be reopened only at will after the dangerous condition has been investigated or the gas in the service line has been turned on again after a shut-down.

A further purpose of the invention is to provide an improved and rugged device of the class described which is simple and inexpensive to construct and easily installed and operated.

These being among the objects of the invention, other and further objects will become apparent from the drawing, the description relating thereto, and the appended claims.

Referring now to the drawing.

Figure 1:
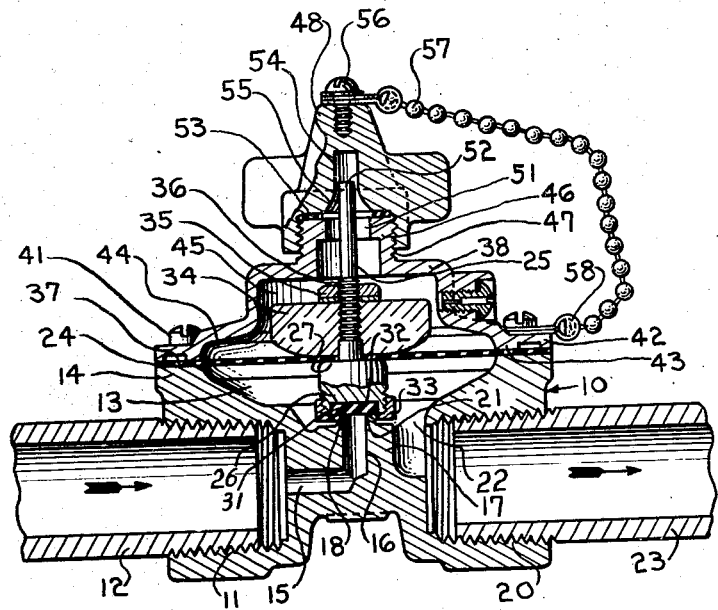
Fig. 1 is a vertical cross section taken longitudinally through the line connections of the preferred embodiment of the invention as shown installed and ready for use.

Referring now to the drawing in further detail, the automatic cut-off valve comprises preferably a brass forging body 10 having a threaded inlet passageway 11 receiving a supply pipe 12 through which gas or other combustible fluids are supplied from a suitable source at a pressure such as the conventional fuel gas pressure of 11″ of water column or 6 ounces per square inch. The body is provided with a cavity or valve compartment 13 in the upper part thereof as bounded marginally by a flange 14. The valve compartment 13 is in communication with the inlet passage through a horizontally drilled passage 15 and a vertically drilled passage 16 extending through a boss 17 formed in the bottom of the compartment 13. The boss 17 is provided with a horizontally disposed portion where the passageway 16 opens upon the upper face 18 thereof as surrounded by an inlet port or valve seat 21.

A second threaded passage 20 is provided in the body 10 which communicates with the chamber 13 through a passageway 22. The threaded passage 20 receives and generally is supported on a nipple or pipe 23 preferably secured to the gas burning appliance (not shown). Although the axes of the inlet and outlet passages 11 and 21 are shown as arranged in alignment with each other, it will be appreciated that they may be angled with respect to each other in event it is found desirable to have them thus, in which case, once installed in an upright position, it would be very difficult for the valve to be thrown or moved out of level. The compartment 13 is closed by a diaphragm 24 which is perforated centrally to receive a valve stem 25. The headed portion is provided integrally with the stem 25 as disposed below and against the diaphragm by a shoulder 27.

The lower face of the head portion 26 receives a synthetic rubber disc 31 in a recess 32 where the disc is held in place by a flanged annulus 33 threaded to the head portion.

Above the diaphragm 24 the stem 25 receives a lead die cast weight 34 and the diaphragm is clamped in sealed relationship between the shoulder 27 and the weight 34 by a lock nut and washer assembly 35 threaded to the stem as at 36 to make of the assembly, a unitary construction which can be assembled in one operation with the body 10. At its outer edges 37, the diaphragm is held in place by a bonnet 38 which is removably secured to the body 10 by screws 41 extending through a flange 42, the lower face of which is grooved to confine the sealing pressure to an inner circular rim 43.

The bonnet 38 is dome-shaped at 44 to permit free movement of the diaphragm and is further recessed at 45 to allow for vertical movement of the weight 34 with adequate room to clear the weight in all of its operative positions. Above the recess 45, the bonnet terminates in a hollow boss 46 threaded upon the outside at 47 to receive a winged cap 48 thereon. At its end, the boss 46 is apertured at 51 to permit the upper end 52 of the stem 25 to extend through and beyond the boss where it may be manipulated from time to time whenever the cap is removed. The aperture 51 is greater than the diameter of the top 52 of the stem 25 by a dimension large enough that the top 52 may be moved sidewise sufficiently to break the seal between the disk and the valve seat 21 to permit the gas to flow through the valve from the inlet opening 11 to the outlet opening 21.

The cap 48 carries a washer 53 which engages the end of the boss 46 in sealed relationship when the cap is tightened in place, and the cap is centrally recessed at 54 to receive the end 52 of the stem 25 in guided relationship, the lower end of the recess 54 being curved outwardly at 55 to assist in directing the stem into the guide recess as the cap is tightened in place. To avoid loss, the cap 48 is secured by a screw 56 to one end of a chain 57 that is fastened at the other end to the bonnet by an eyelet 58 held beneath the head of one of the screws 41.

At one side, the bonnet 38 is provided with a boss 61 which is drilled, threaded and recessed to receive a screw 62 therein which carries a washer 63 that provides a seal between the screw and the bonnet. The screw 62 in turn, is perforated to provide a small, bleed opening 64 for differential pressures which might exist between the inside and the outside of the bonnet.

Figure 2:
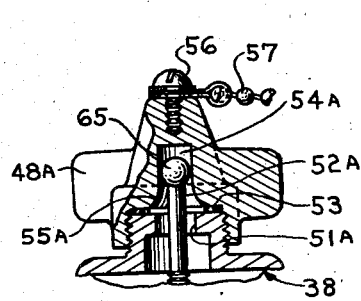
Fig. 2 is a fragmentary view similar to Fig. 1 showing another form of a manual control means for opening the valve after a cut-off.
Figure 3:
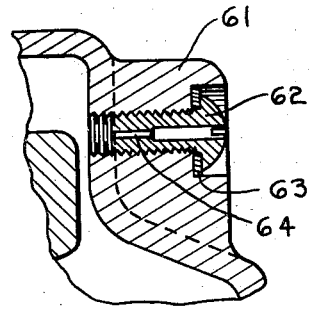
Fig. 3 is an enlarged section of the bleed construction for the bonnet.

Referring now to the modifications shown in Fig. 2, the top of the stem 52a is provided with a ball form 65 at the end thereof which may be more easily gripped whenever manipulation of the valve is required, and the opening 51a is large enough to either receive the ball 65 therethrough or provide for the required lateral motion of the stem already described, whichever requirement is the greatest. In cooperation with the ball 65, the guide recess 54a is provided with a diameter large enough to receive the ball in guided relationship.

For purposes of the operation of the valve described, the inlet and outlet pipes may be considered to be ¾" pipe insofar as the presentation of a specific embodiment is concerned from which relative dimensions may be determined. The working diameter of the diaphragm 24 is approximately $2\tfrac{5}{16}''$. The weight 34 weighs approximately 3 ounces and the diameters of the passage 16 and the vent opening 64 are approximately $\tfrac{3}{16}''$ and .010", respectively.

It will be appreciated from the description that the resting position of the valve is one in which the weight closes and holds closed the disk 31 against the valve seat 21. Assuming then, that the gas pressure of 6 ounces per square inch is turned on in the inlet pipe 12 it will be seen that the exposed area of the disk at the valve seat 21 is not sufficient to lift the valve against the downward force of the weight 34.

The condition of appliance to which the valve is connected having been checked, the cap 48 is removed and the stem 52a moved laterally to break the seal between the disk and the valve seat 21. Immediately, the gas begins to flow through the opening thus created, until the pressure in the compartment 13 is great enough over the working area of the diaphragm to lift the weight. In most instances this critical pressure would be 4" or 5" of water column but with the construction shown and described herein, whenever it is desirable to hold the operation of the valve to closer limits, the working area of the diaphragm 24 and the weight 34 may be varied according to well known engineering principles to function at a higher critical pressure without the operation or effectiveness of the valve being materially affected and without increasing the danger of false closings.

Above the pressure at which the valve is constructed to close the disk 31 will be raised to wide open position by the pressure exerted upon the diaphragm and the cap can then be returned and tightened in place.

After the cap is in place, movement of air to and from the compartment 44 is restricted to the bleed opening 64 which as already described, has a .010" diameter that provides a very slow flow of air therethrough permitting equalization in about 30 seconds or a fuel gas flow therethrough of about ¼ cu. ft. each hour under expected pressures. In moving from the open to the closed position, the diaphragm displaces approximately 4.4 cubic centimeters in the compartment 45 and this displacement bears a ratio of 1 to 3 to the total volume present in the compartment as shown in the particular embodiment illustrated.

With this arrangement the bleed opening 64 provides a delayed closing factor for the valve of approximately two and one half seconds, so that a sudden and temporary withdrawal of gas from the outlet 23 will not operate to cause an immediate closing of the valve but will permit the valve to re-cover itself as the gas begins to flow to the compartment through the port 21 to return the pressure in the outlet pipe to its working pressure. Only in the event the withdrawal continues, in a degree indicating the occurrence or existence of a dangerous condition, will the vent opening 64 continue to bleed the partial vacuum in the compartment 45 to permit the weight 34 to close the valve. An excessive flow in the particular construction shown would be something in excess of 30 cu. ft. per hour. Up to and including this amount, the passageway 16 is capable of supplying sufficient quantities of gas to maintain the pressure in the valve compartment 13 above the critical pressure.

In addition to the function of delaying the closing of the valve, the bleed opening serves to vent the compartment in event the diaphragm is ruptured. The vent opening 64 then serves in two capacities. If the rupture is a large one, the vent opening 64 restricts the escape of gas enough that a gas pressure will be built up in the compartment 45 to equalize the pressure in compartment 13 enough to close the valve thereby warning of the existence of a dangerous condition which upon investigation, as by removal of the cap 48 will indicate that a defect has arisen; the odor of the gas which is freed by the opening of the cap 48 serving as an indication.

In event the rupture is small, the bleed of gas through the opening 64 is just enough to give a warning odor yet not enough to be dangerous with respect to fire or explosion. In this way the invention provides an improved automatic cut-off valve for the purposes and objects set forth herein and although throughout the specification and drawing various constants, dimensions and structural relationships have been set forth for purpose of illustration, it will be apparent to those skilled in the art that various uses, modifications and changes may be made therein, especially if compensatory changes are made in the associated parts without departing from the spirit and substances of the invention, the scope of which is commensurate with the appended claims.

What is claimed is:

1. In an automatic cut-off valve the combination of two rectilineally co-operating valve elements, a valve body and a bonnet, a diaphragm between the body and bonnet controlling the action of the valve elements with one of the valve elements abutting the diaphragm, means for normally closing the valve members, a stem on one of the members extending through the bonnet, said bonnet and stem being so constructed and arranged that angular movement between the valve elements may be had to open the valve by manipulating the stem to provide such movement, means for sealing the bonnet when the stem extends through it constructed and arranged to suggest manual removal, and means for guiding the stem when said sealing means is in place.

2. In an automatic cut-off valve the combination of two co-operating valve members, a valve body and a bonnet, a diaphragm between the body and bonnet, said diaphragm being spaced from one of the valve members approximately the thickness of the other valve member and controlling the action of the valve members, means exerting a constant effort for normally closing the valve members, a stem on one of the members extending through the bonnet, said bonnet having an opening around the stem large enough that substantial angular movement between the valve members to break their sealed relationship may be had by manipulating the stem by lateral movement of the top of the stem, means for sealing the bonnet where the stem extends through it, and means for guiding the stem when said sealing means is in place, said guiding means being removable when lateral movement of the stem is desired.

3. An automatic cut-off valve comprising valve elements, a pressure responsive diaphragm, a bonnet, a stem connected to one of the valve elements and the diaphragm and extending through the wall of the bonnet a distance enough to enable manipulation; said bonnet having an opening affording access to the stem, a readily removable cap means for closing said opening, said opening being large enough around the stem to permit manual tilting of the valve to unseat it when the cap is removed, and means for guiding the stem upon movement of said one of the valve elements by the diaphragm in response to variations of pressure on the diaphragm when the cap means is in place.

4. An automatic cut-off valve comprising a housing having a valve chamber, cooperating valve elements controlling the flow of fluid under pressure into the chamber, a diaphragm responsive to pressure present in the chamber, a bonnet, a stem connected to one of the valve elements and the diaphragm and accessible through an opening in said bonnet for manipulation, said opening being large enough to permit lateral movement of the stem manually to tilt said one of the valve members and unseat it with respect to the others of the valve members, and means received by said bonnet for guiding the stem upon movement of said one of the valve members by the diaphragm in response to variations of pressure in the compartment when said one of the valve members is unseated.

5. In an automatic cut-off valve, comprising a housing having a valve chamber, cooperating valve elements controlling the flow of fluid under pressure into the chamber, a diaphragm responsive upon one side thereof to pressures present in the chamber, a bonnet defining a compartment upon the other side of the diaphragm, a stem connected to one of the valve elements and the diaphragm and accessible through an opening in said bonnet for manipulation, said opening being large enough to permit lateral movement of the stem manually to tilt said one of the valve members and unseat it with respect to the other of the valve elements, means for closing said opening including a guide for the stem upon movement of said one of the valve elements by the diaphragm with pressure changes in the valve chamber, means for exerting a force upon the diaphragm tending to seat the valve elements but insufficient to seat the valve elements against pressure present in said valve chamber, and fluid flow restricting means for venting the bonnet compartment to the atmosphere when said closing means is in place to increase the pressure therein and thereby assist said valve closing means whenever a predetermined flow of fluid under pressure leaks through the diaphragm from the valve chamber to the bonnet compartment in event the diaphragm is damaged.

6. An automatic cut-off valve including a housing having a valve compartment thereon, valve means disposed in said compartment, a diaphragm closing said compartment and controlling said valve means, a concave bonnet engaging the diaphragm in sealed relation and having two openings through the wall thereof, a stem carried by the diaphragm for manipulating the valve means and received in one of the openings for longitudinal and lateral manual movement in said opening, manually removable means for sealing said one opening, and a means in the other opening restricting the passage of fluid through same to a flow of approximately one-quarter cubic foot of gas per hour at eleven inches of water column pressure.

7. In an automatic cut-off valve including a housing having a valve compartment therein, valve means disposed in said compartment controlling the inflow of fluid under pressure into said compartment, a pressure responsive diaphragm closing said compartment and controlling said valve means, concave bonnet means engaging the diaphragm in sealed relationship to provide a cavity, said bonnet means having an opening therein and including a removable closure element for sealing said opening, a stem controlling said valve means received in said opening for longitudinal and lateral movement therein, said diaphragm having a displacement ratio with respect to the cavity of approximately one to three, said bonnet means having a second opening therein, and means in said second opening restricting the passage of fluid through same to a flow of approximately a one-quarter cubic foot of gas per hour at eleven inches of water column.

8. In an automatic cut-off valve including a housing having a valve compartment therein, valve means disposed in said compartment controlling the inflow of fluid under pressure into said compartment, a pressure responsive diaphragm closing said compartment upon one side thereof and controlling said valve means, bonnet means defining a bonnet compartment upon the other side of said diaphragm, means for moving said valve means to open position including a stem extending through an opening in said bonnet means large enough to receive the stem for lateral movement thereof to tilt said valve means, means for normally pressing the diaphragm downwardly including a weight mass displacing a large volume of said bonnet compartment, and means for delaying the action of said diaphragm pressing means upon a fall of pressure in said valve compartment including a closure element sealing said opening and a restricted vent communicating with atmosphere and subjecting the bonnet compartment to a partial vacuum induced by said diaphragm pressing means.

9. In combination in a cut-off valve for combustible gas systems, a hollow housing defining a cavity and an inlet and an outlet passage, said inlet passage leading into said cavity and said outlet passage leading therefrom, a valve seat within said cavity and about said inlet passage, a diaphragm forming a wall of said cavity, a bonnet member secured to said housing, a perforation in said bonnet and a closure removably positioned upon said bonnet and about said perforation adapted when in position to cut off said perforation from the exterior, a valve member positioned within the cavity and secured to the diaphragm in position to be seated upon said valve seat, a valve stem secured to and extending outwardly from said diaphragm into and through said bonnet, a weight urging the valve seat to close the valve, a second opening in said bonnet, and a member positioned in said second opening having a bleed therein of a size creating a partial vacuum in the bonnet retarding the action of the weight when there is a drop in pressure in said cavity and a pressure in the bonnet assisting the weight upon leakage of fluid under pressure through the diaphragm in excess of a predetermined amount due to a rupture of the diaphragm.

10. A cut-off valve comprising a hollow housing defining a cavity and an inlet and an outlet passage, said inlet passage leading into said cavity and said outlet passage leading therefrom, a valve seat within said cavity and about said inlet, a diaphragm closing said cavity, a bonnet secured to said housing including a bonnet member having a perforation in said bonnet and a closure member removably positioned upon said bonnet member and about said perforation adapted when in position to cut off said perforation from the exterior, a valve member positioned within the cavity and secured to the diaphragm and positioned to be seated upon said valve seat, a valve stem secured to and extending outwardly from said diaphragm into and through said bonnet, a weight positioned upon said stem, a second opening in said bonnet and a vent member removably positioned in said second opening, said vent member having a bleed constituting the sole communication between the compartment and the atmosphere when said closure member is in place and co-operating with the weight to develop a partial vacuum upon one side of the diaphragm, when the pressure is released upon the other side.

11. A cut-off valve comprising a hollow housing defining a cavity and an inlet and an outlet passage, said inlet passage leading into said cavity and said outlet passage leading therefrom, a valve seat within said cavity and about said inlet passage, a diaphragm closing said cavity exposed upon one side to pressures in the cavity, a bonnet member secured to said housing providing a compartment upon the other side of the diaphragm, a perforation in said bonnet and a closure removably positioned upon said bonnet and about said perforation adapted when in position to cut off said perforation from the exterior, a valve member positioned within the cavity and secured to the diaphragm in position to be seated upon said valve seat, a valve stem secured to and extending outwardly from said diaphragm into and through said bonnet to a position where it may be manipulated when the closure is removed, a weight disposed in said compartment and displacing a substantial volume of said compartment, said weight urging the valve member towards the valve seat, and a bleed for the compartment having a restricted diameter capable of delaying the action of said diaphragm when the closure is in place.

WILLIAM C. BUTTNER.